(12) United States Patent
Ibrahim

(10) Patent No.: US 7,568,822 B2
(45) Date of Patent: Aug. 4, 2009

(54) PREDICTIVE ADAPTIVE FRONT LIGHTING ALGORITHM FOR BRANCHING ROAD GEOMETRY

(75) Inventor: Faroog Abdel-kareem Ibrahim, Dearborn Heights, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 248 days.

(21) Appl. No.: 11/692,560

(22) Filed: Mar. 28, 2007

(65) Prior Publication Data
US 2008/0239698 A1    Oct. 2, 2008

(51) Int. Cl.
*B60Q 1/06* (2006.01)

(52) U.S. Cl. .............. 362/466; 362/37; 362/464
(58) Field of Classification Search ............ 362/37, 362/464, 466
See application file for complete search history.

(56) References Cited

U.S. PATENT DOCUMENTS

| | | | |
|---|---|---|---|
| 4,583,152 A | 4/1986 | Kawai et al. | |
| 5,537,003 A | 7/1996 | Bechtel et al. | |
| 5,588,733 A * | 12/1996 | Gotou | 362/37 |
| 6,161,071 A | 12/2000 | Shuman et al. | |
| 6,459,387 B1 * | 10/2002 | Kobayashi et al. | 340/988 |
| 6,984,060 B2 | 1/2006 | Baba et al. | |
| 6,993,255 B2 | 1/2006 | Braun et al. | |
| 7,104,664 B2 | 9/2006 | Sugimoto et al. | |
| 7,477,976 B2 * | 1/2009 | Horii et al. | 701/49 |
| 2003/0031008 A1 * | 2/2003 | Kobayashi | 362/37 |

* cited by examiner

*Primary Examiner*—Laura Tso
(74) *Attorney, Agent, or Firm*—Brinks Hofer Gilson & Lione

(57) ABSTRACT

A system for predictive front lighting of a vehicle. The system includes at least two headlamps, at least two swivel mechanisms and a controller. The first and second headlamps project a beam pattern for illumination of the vehicle path. The controller receives vehicle position data, as well as, data regarding a most likely path and a secondary path of the vehicle. The controller then calculates the desired swivel angle of the headlamps based on the most likely path of the vehicle and the secondary path of the vehicle, and the swivel mechanisms respectively manipulate each of the headlamps to accordingly change alignment of the headlamps based on the swivel angle for each of the of the headlamps.

16 Claims, 7 Drawing Sheets

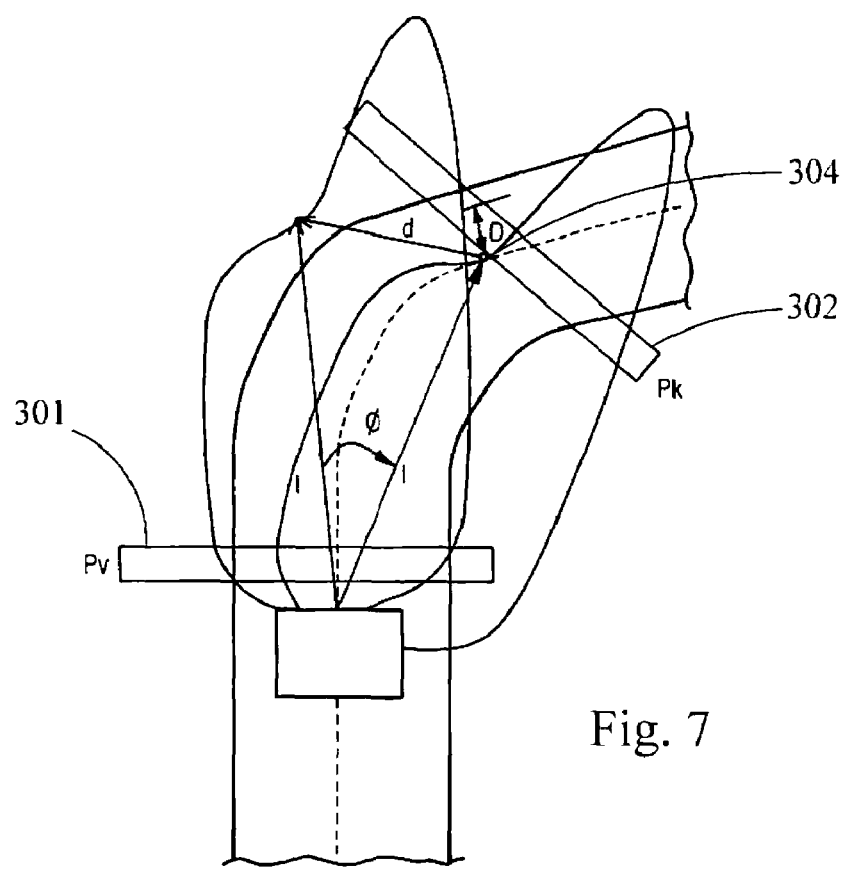
Fig. 7
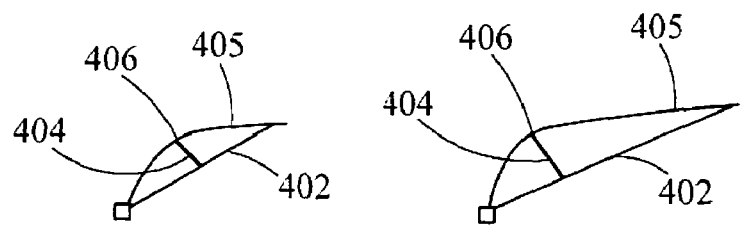
Fig. 8A  Fig. 8B
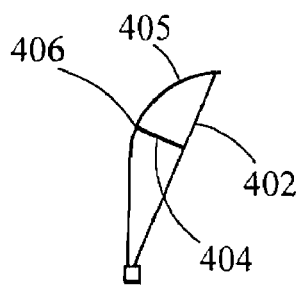 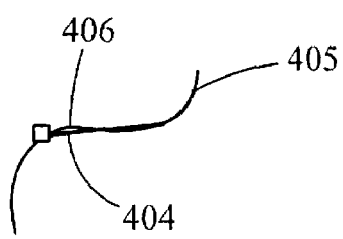
Fig. 8C  Fig. 8D

PREDICTIVE ADAPTIVE FRONT LIGHTING ALGORITHM FOR BRANCHING ROAD GEOMETRY

BACKGROUND

1. Field of the Invention

The present invention generally relates to a system for adapting front lighting in branched road geometries.

2. Description of Related Art

Conventional Adaptive Front Lighting (AFS) uses the steering angle and the vehicle speed as the core data to estimate the desired swivel angle of the headlamps. Accordingly, the system only reacts to the sensed instantaneous path of the vehicle. In some instances, however, the instantaneous vehicle path is not entirely indicative of road path in front of the vehicle or even the desired road path. This may often be true just before the vehicle enters or exits a curve, during a changing radius of curvature curve, or an S-curve scenario. Often it may be advantageous for the headlamps' performance to illuminate the upcoming road (leading the way) when it varies from the current vehicle path. For example, this may be desirable where the road branches or at an intersection. Therefore, lighting provided by conventional AFS systems would not be optimal in these scenarios. Another disadvantage of conventional AFS systems is their inability to predict the road geometry ahead. This can be a particular problem when approaching branches, on/off ramps, or intersections.

In view of the above, it is apparent that there exists a need for an improved adaptive front lighting system for motor vehicles.

SUMMARY

In satisfying the above need, as well as overcoming the enumerated drawbacks and other limitations of the related art, the present invention provides an improved adaptive front lighting system for a vehicle. According to the present invention, the system predicts upcoming vehicle path data to optimally manipulate the beam from the headlamps.

The system includes at least two headlamps, at least two swivel mechanisms, and a controller. The headlamps cooperate to project a beam pattern for illumination of the vehicle path. The swivel mechanisms each respectively manipulate a headlamp to change the swivel angle of the headlamps.

In operation, the controller receives vehicle position data, for example from a GPS system. The controller may access a map database and use the vehicle position data to identify a map location of the vehicle. The controller analyzes the map to determine a most likely path, based on the map location and other vehicle heading parameters. The controller may also identify a secondary path in the road geometry. The controller then calculates the desired swivel angles of the first and second headlamps based on the most likely path and the secondary path and causes the headlamps to be appropriately moved so that the most likely vehicle path is illuminated.

The first desired swivel angle may be calculated based on the branching angle of the most likely path, a distance to branch, and a time to reach the branch. Similarly, the second desired swivel angle may be calculated based on the branching angle of the secondary path, a distance to branch and a time to reach the branch. Further, the controller may be configured to calculate a nominal swivel angle such that a kink point (further discussed below) of the first headlamp beam will be a predefined distance from a host vehicle lane center. Accordingly, the controller may calculate a weighted average angle of the first desired swivel angle and the nominal swivel angle. The headlamp associated with the most likely path is then manipulated based on the weighted average.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 7 is an overhead view illustrating the calculation of the desired swivel angle; and FIG. 8A-D are examples illustrating the maximum deviation point for various curved scenarios.

DETAILED DESCRIPTION

Figure 1:
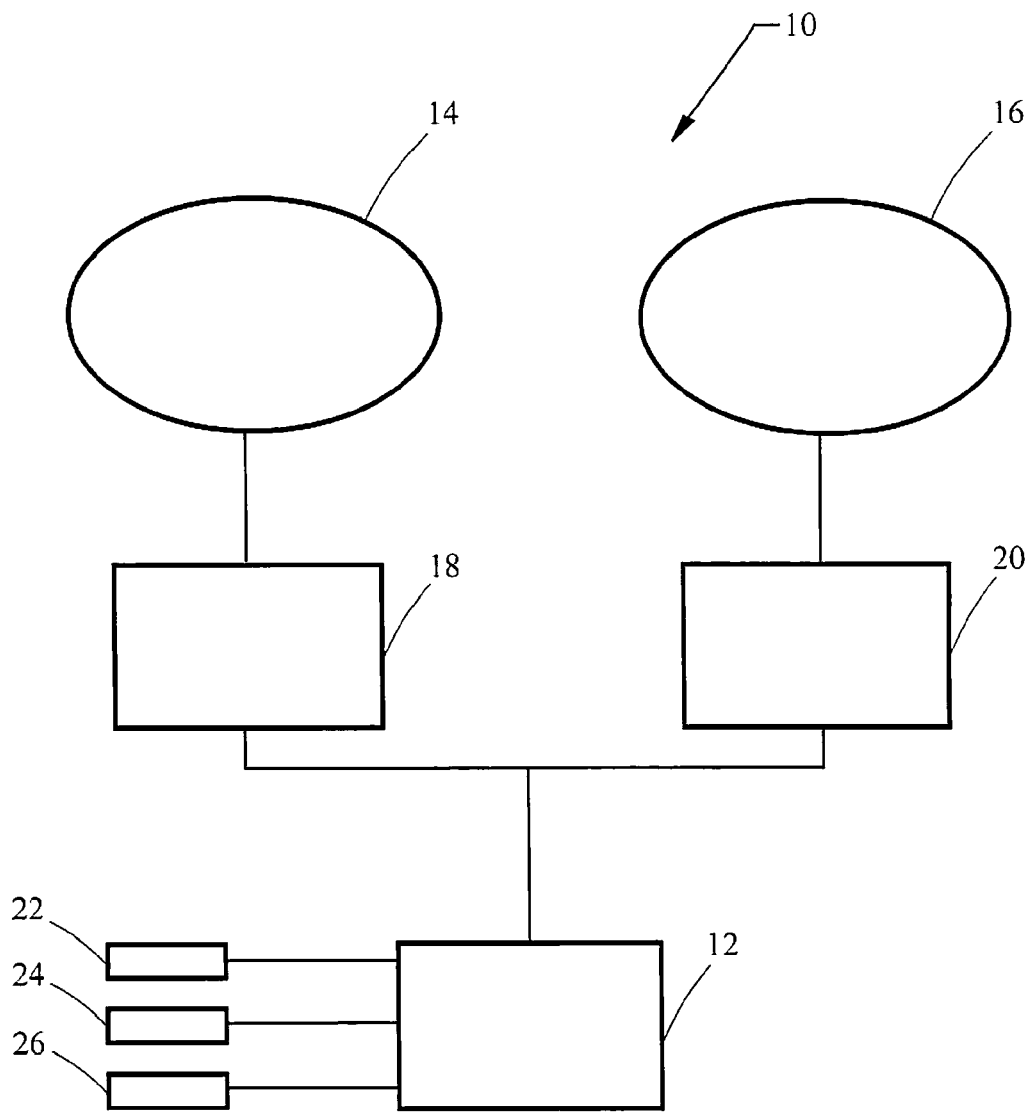
FIG. 1 is a schematic view of an adaptive front lighting system for a vehicle and embodying the principles of the present invention.

Referring now to FIG. 1, a system embodying the principles of the present invention is illustrated therein and generally designated at 10. The system 10 includes a controller 12, at least two headlamps 14, 16 and at least two swivel mechanisms 18, 20 each respectively mounted to one of the headlamps 14, 16. A controller 12 receives input from one or more of a GPS system 22, a yaw rate sensor 24, and a vehicle speed sensor 26. The controller 12 is configured to predict a most likely vehicle path based on a stored map database and the various inputs from the GPS system 22, the yaw rate sensor 24, and/or the vehicle speed sensor 26. Based on the predicted path, the controller 12 manipulates the swivel mechanisms 18, 20 to respectively direct the headlamps 14, 16 for illumination of the predicted vehicle path. The swivel mechanisms 18, 20 may take many forms, including, for example, a linear drive for controlling motion that is attached to one side of the headlamp causing it to swivel about a pivot point or a drive for direct rotational control. Regardless of the implementation, the swivel mechanisms 18, 20 manipulate a projected position of the light beam from the headlamps 14, 16 in front of the vehicle. This manipulation may be in a common plane or in more than one plane.

The controller 12 predicts the upcoming vehicle path, assuming a single path, to optimally swivel the headlamps' beam. As noted above, in many scenarios, the current vehicle heading or steering parameters may not accurately indicate the future vehicle path and/or optimal illumination pattern for the driver.

Figure 2A:
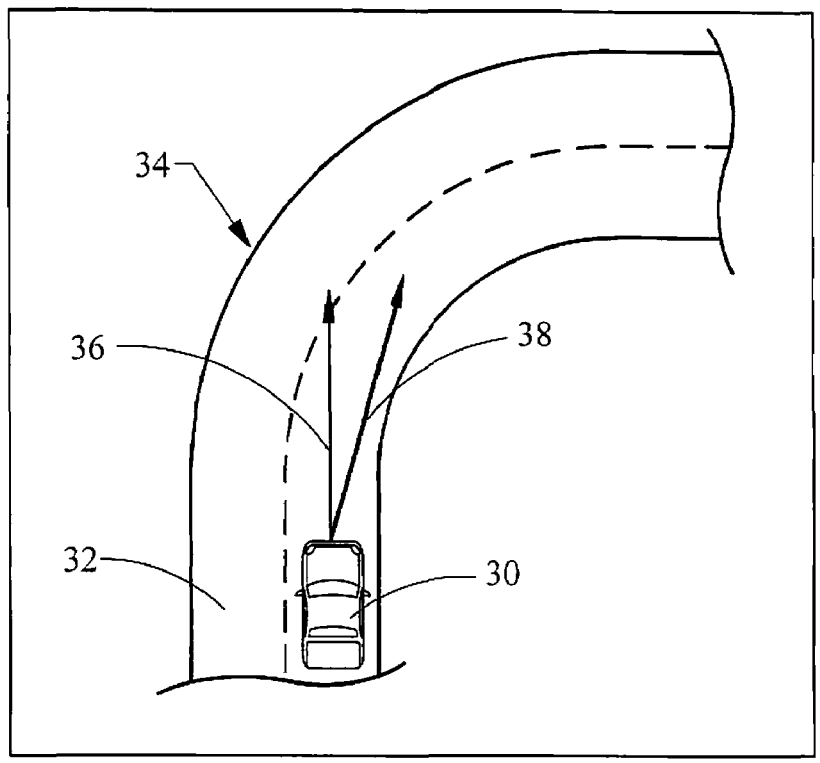
FIG. 2A is an overhead view of a curved entry scenario.

In the scenarios shown in FIGS. 2A-D, a conventional AFS system, as previously described, fails to swivel the headlamps to the optimal position for the future vehicle path. In FIG. 2A, a curve entry scenario is shown. In this scenario, the vehicle 30 is driven on a straight road 32 just prior to a curve 34. The vehicle yaw, as well as, the steering wheel angle would seem to indicate that the vehicle path would be straight in front of the vehicle 30, as denoted by arrow 36. Accordingly, a conventional AFS system would illuminate the area directly in front of the vehicle 30. This may cause the headlamps to glare at oncoming traffic. However, it is desirable for the headlamps to start to swivel ahead of the curve to improve the visibility of the curve ahead and to avoid glare for the oncoming traffic, as denoted by arrow 38.

Figure 2B:
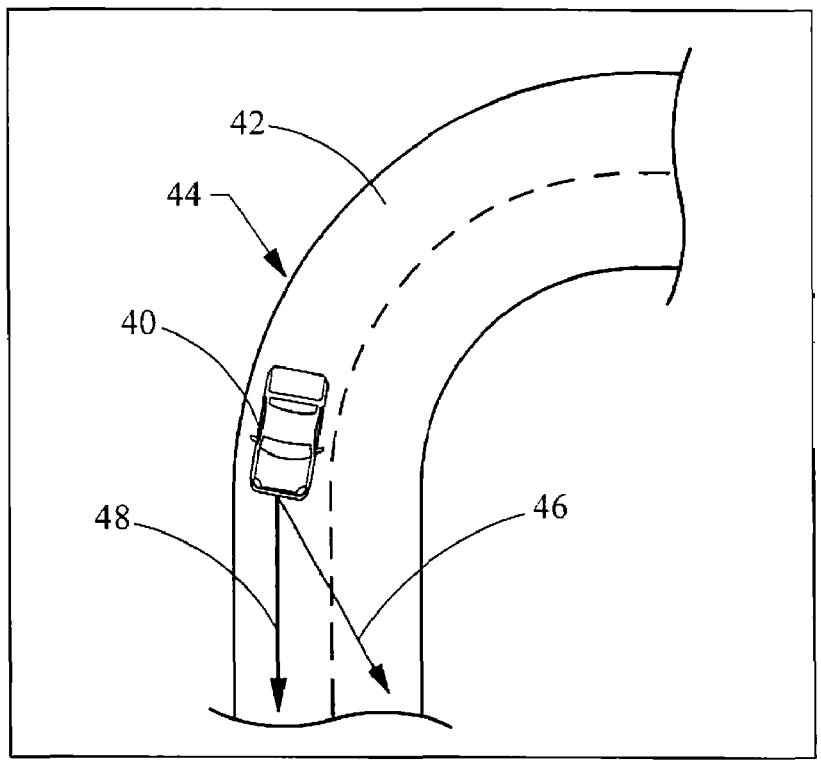
FIG. 2B is an overhead view of a curved exit scenario.

In FIG. 2B, a curve exit scenario is shown. The vehicle 40 is driven on a curved road 42 just prior to exiting a curve 44 in this scenario. The vehicle yaw, as well as the steering wheel angle, indicates that the vehicle 40 is currently turning at a given turn angle. Accordingly, a conventional AFS system would illuminate an area in front of the vehicle 40, but offset by the turn angle, as denoted by arrow 46. It is desirable in this scenario that the headlamps start to swivel back to the straight position before the end of the curve to improve the visibility of the straight road segment ahead and to avoid glare for the oncoming traffic, as denoted by arrow 48.

Figure 2C:
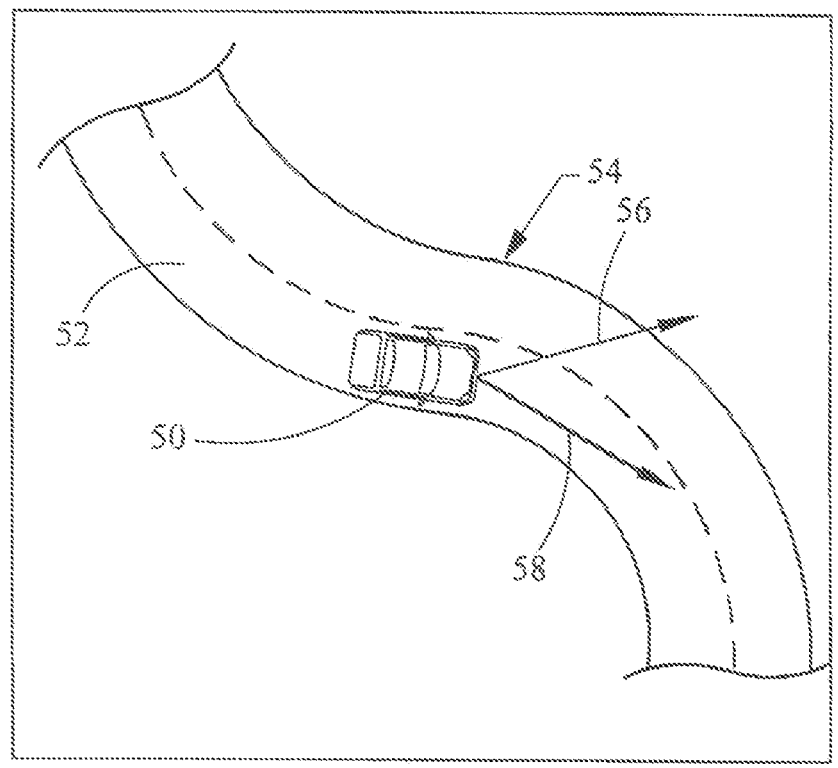
FIG. 2C is an overhead view of the S-curve scenario.

In FIG. 2C, an S-curve scenario is shown. Here, the vehicle 50 is driven on a road 52 through an S-curve 54. The vehicle yaw, as well as, the steering wheel angle indicate that the vehicle 50 is currently turning at a given turn angle. Further, for the example shown, the yaw rate indicates the vehicle 50 is turning to the left. Accordingly, a conventional AFS system would illuminate an area in front of the vehicle, but offset to the left by the turn angle, as denoted by arrow 56. Not only would the headlamps glare the oncoming traffic, but the headlamps would provide illumination that is directed to the left of the vehicle 50 when the future vehicle path is to the right of the vehicle 50. Therefore, it is desirable that the headlamps start to swivel before the vehicle 50 reaches the saddle point in the direction of the upcoming curve so as to improve the visibility of the curve ahead and to avoid glare for the oncoming traffic, as denoted by arrows 58.

Figure 2D:
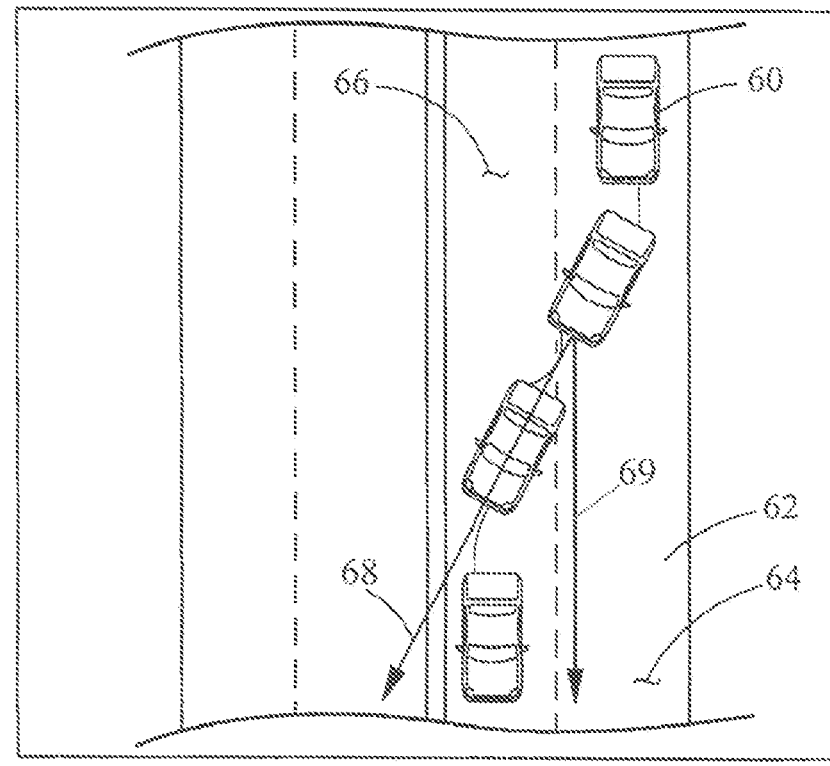
FIG. 2D is an overhead view of a lane change scenario.

Finally, a lane change scenario is shown in FIG. 2D. Ideally, the system 10 will keep the headlamps' beam parallel to the road, as denoted by arrow 69 while the vehicle 60 is driven along a straight segment of road 62 and changes from a first lane 64 to a second lane 66. The vehicle yaw, as well as the steering wheel angle, indicate that the vehicle 60 is currently turning at a given turn angle, as denoted by arrow 68. The general path of the vehicle 60, however, is straight ahead and should be illuminated as shown by arrow 69.

A conventional AFS system cannot achieve the above desired performances because it uses the instantaneous (at the vehicle current position) steering angle and vehicle speed measurements to manipulate the headlamps 14, 16. Even if the instantaneous measurement is filtered and dead zones are applied to overcome any jittering in the steering angle measurement resulting from the lane adjustments by the driver, the illumination will still not be optimal. Filtering and dead zoning operations delay performance of a conventional AFS in the above road scenarios. Moreover, conventional AFS performance is negatively affected by many typical driving behaviors, for example lane changes. It is desirable that the headlamps do not remain in their straight position in this road scenario.

Figure 3:
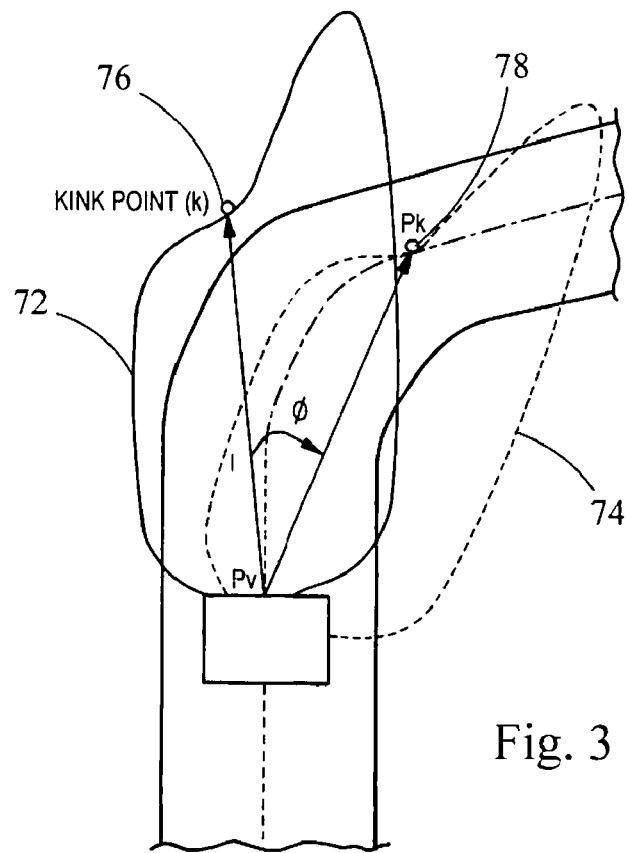
FIG. 3 is an overhead view illustrating the effect of the swivel angle on the beam pattern.

FIG. 3 shows, in the curve entry scenario, a first projected beam pattern 72 for a conventional AFS system (in this scenario) and a second beam pattern 74 for the system 10, of the present invention. The first beam pattern 72 has a kink point 76 formed by the overlapping patterns from the first and second headlamp 14, 16. A kink point is an inflection point in the low beam and may have a luminance value of around 1 Lux. Further, the kink point may be the location in the low beam where the longitudinal axis of the vehicle intersects with the cut-off line between the high and the low beams. Ideally, the kink point is located in the center of the desired illumination area. Similarly, the second beam pattern 74 has kink point 78. The system 10 swivels the headlamps' beam by an angle φ such that the beam's kink point 74 is in the middle of the host vehicle lane, the lane occupied by the vehicle equipped with the present system 10. In achieving this, the system 10 utilizes an algorithm that calculates the upcoming path data (such as curvature data) along the predicted vehicle path. The system 10 is configured to achieve the optimal visibility for travel in the host vehicle travel lane, under the constraint that the glare is minimized, to the extent possible, for oncoming traffic.

Unfortunately, turns in roads do not have a constant curvature. As a result, swiveling a constant shape headlamp beam pattern to optimally cover the host vehicle lane can be challenging without glaring the oncoming traffic or increasing the visibility on one part of the lane at the expense of the other part. Further, the geometry of some roads may pose particular challenges. For example in an S-curve road geometry, the direction (sign) of the curvature changes quickly over a relatively short distance. Similar challenges arise when the vehicle changes lanes.

Figure 4:
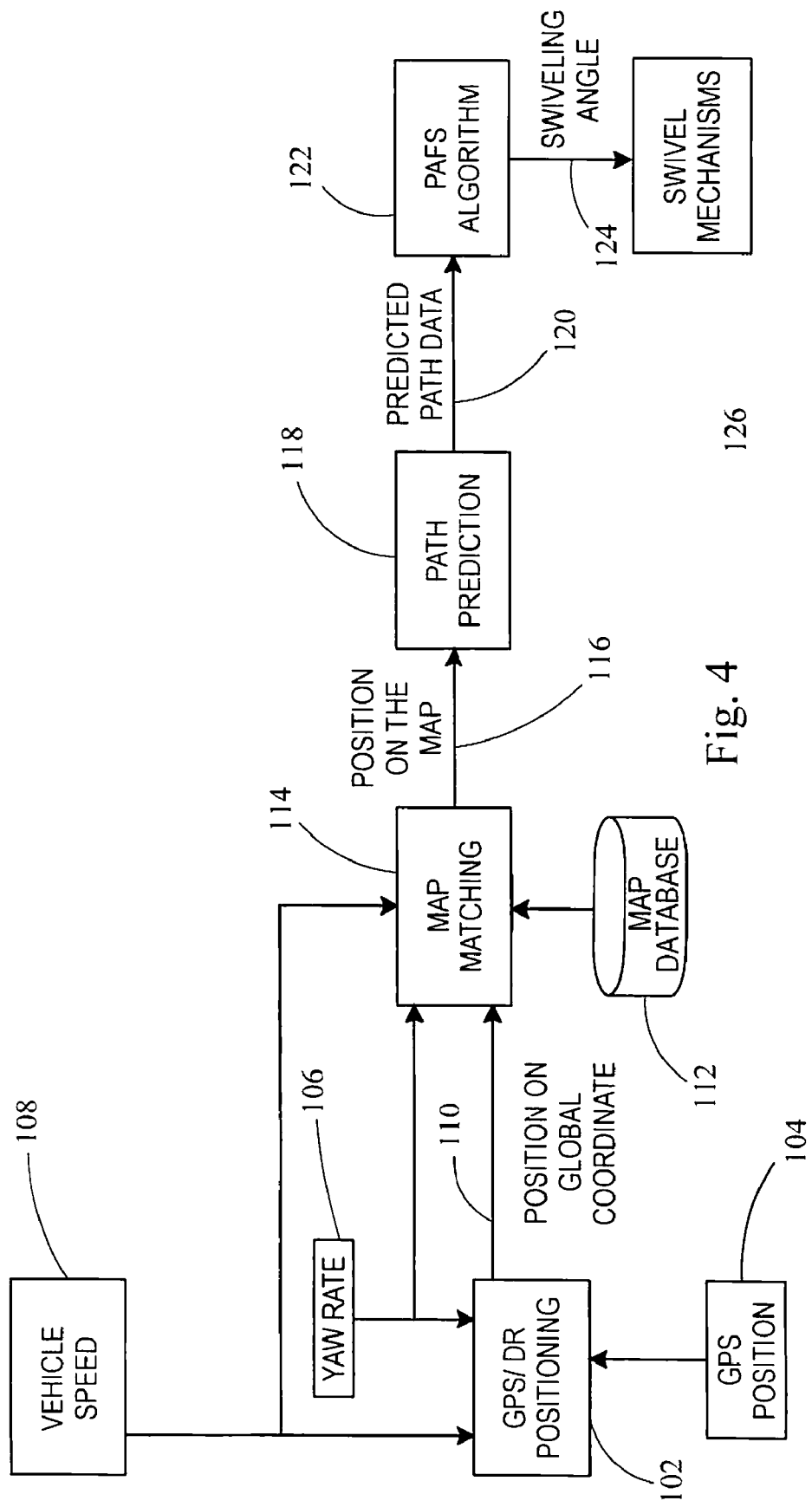
FIG. 4 is a block diagram of a method for determining a desired swivel angle.

FIG. 4 shows a block diagram of the algorithm used by the controller 12 for controlling the swivel mechanisms 18, 20 in accordance with the present invention. In block 102, the GPS position from block 104 is augmented with the yaw rate measurement from block 106 and speed measurement from block 108. The GPS position, yaw rate, and/or vehicle speed are used to calculate the vehicle position 110 in a global coordinate system. Using the map database 112, the map-matching algorithm 114 identifies the calculated vehicle position 116 on a map. The path prediction algorithm 118 analyzes the map relative to calculated position and the direction of vehicle travel. The path prediction algorithm 118 calculates the candidate list of the probable intended driving paths. From the list, the path prediction algorithm 118 determines the most probable path by associating confidence scores to each driving path on the list. Once the most likely path (MLP) is determined, the path prediction algorithm calculates the curvature of the MLP. The path data 120, including the resultant curvature values, are provided to the predictive adaptive frontlighting system (PAFS) algorithm block 122. The PAFS algorithm 122 uses the calculated path data 120 in order to determine the desired swiveling angle 124 of each headlamp 14,16. The desired swivel angles 124 are respectively provided to the swivel mechanisms 18, 20, as denoted by block 126.

Sometimes the confidence scores may be close between two or more driving paths. In this scenario, the resultant curvature values and other path data such as branching angle, distance to branching, are passed to the PAFS algorithm 122. The PAFS algorithm 122 uses the calculated paths data in order to determine the desired headlamp swiveling angles.

When the confidence scores between two paths are close, the PAFS algorithm 122 may light the two possible road paths, the MLP and a secondary path (SP), one with one headlamp and one with another headlamp. The PAFS algorithm 122 may calculate the swivel angle of each headlamp based on a function of the established confidence in each path, the curvature distribution of each path, the branching angle between the two paths, the distance between the vehicle position and the road branching point, and the time needed to reach the branch. The PAFS algorithm approach may vary based on the confidence level of the MLP, as shown in FIG. 5.

Figure 5:
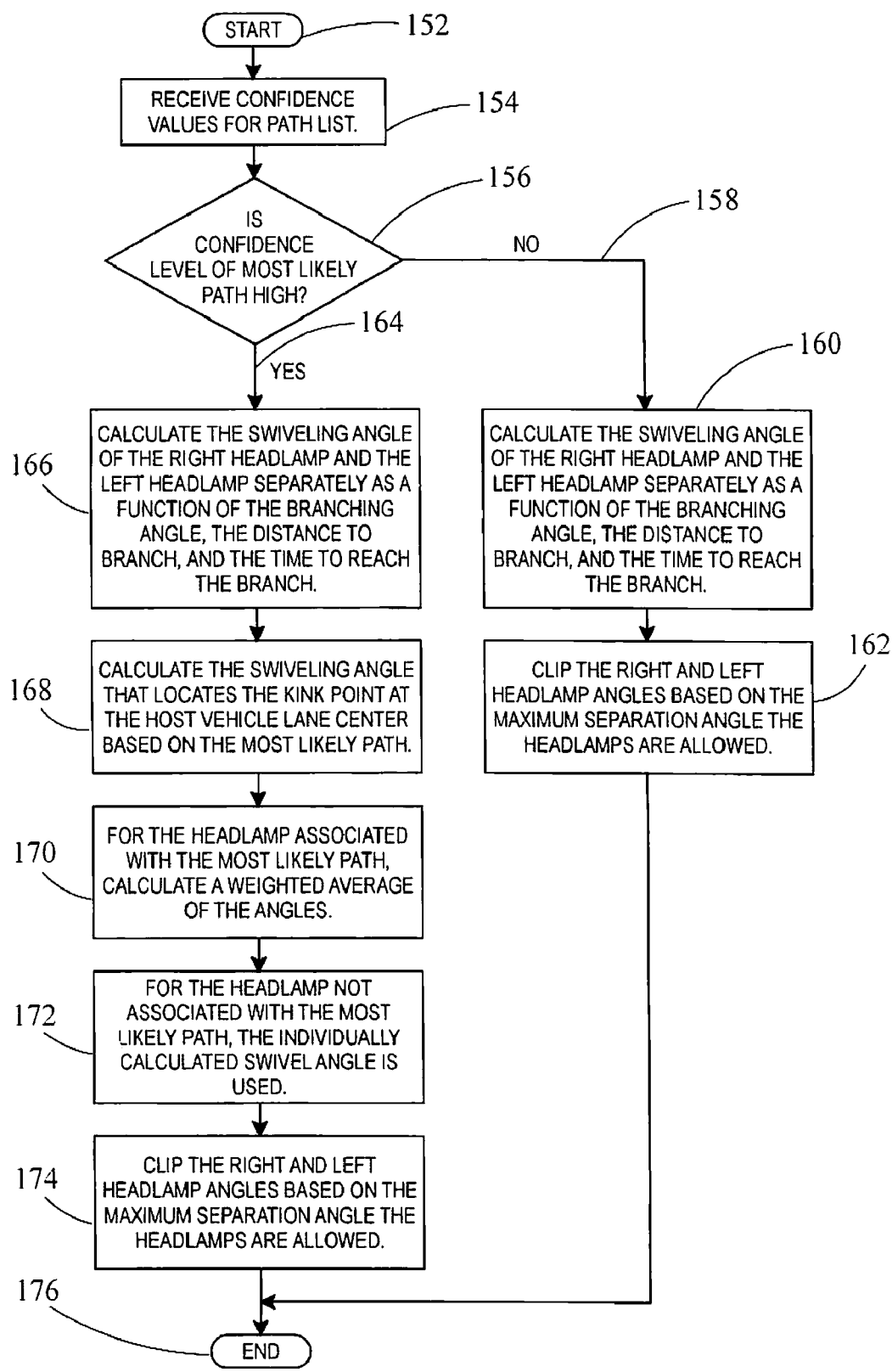
FIG. 5 is a flowchart of a method for calculating the desired swivel angle.

In FIG. 5, the method 150 starts in block 152. In block 154 the PAFS algorithm 122 receives confidence values and path data for the path list. In block 156 the system determines if the confidence level of the most likely path is high, for example above a threshold level either independently or relative to the confidence values for other paths in the path list. If the confidence level is not high the method 150 follows line 158 to block 160. In block 160, the PAFS algorithm 122 calculates the swivel angles of the right and headlamps separately as a function of the branching angle between the MLP and the SP, the distance to the branch, and the time to reach the branch. In block 162, the swivel angle for the right and left headlamps are clipped based on the maximum separation angle that headlamps are allowed. The method then ends in block 176.

Referring again to block 156, if the confidence level of the most likely path is high, the method 150 follows line 164. In block 166, the PAFS algorithm 122 separately calculates the swivel angle of the right headlamp and left headlamp as a function of the branching angle of the most likely path and the secondary path, the distance to the branch, and the time to reach the branch. In block 168, the PAFS algorithm 122 calculates a swivel angle that locates the kink point of the beam pattern at the center of the host vehicle lane for the MLP. For the headlamp associated with the MLP, the PAFS algorithm 122 calculates a weighted average of the swivel angle calculated in block 166 and the swivel angle calculated in block 168. For further clarification, if the PAFS algorithm 122 determines that the MLP is to the right of the second path, the PAFS algorithm 122 will calculate the weight average of the right headlamp, calculated in block 166, along with the swivel angle that locates the kink point at the center of the host lane of the most likely path. The weight average angle is then applied to the associated headlamp, in this example, the right headlamp. For the headlamp not associated with the most likely path, the left headlamp in the example, the individually calculated swivel angle from block 166 is applied, as denoted in block 172. In block 174, the right and left headlamp angles are clipped based on the maximum separation angle the headlamps are allowed. The left and right headlamps are then manipulated by the swivel mechanisms to effectuate the calculated swivel angles for the left and right headlamp and the method 150 ends as denoted on block 176.

Due to limitation in the map and GPS position accuracies, it is possible that the map-matching algorithm 114 will have difficulty in correctly placing the vehicle on the map in the vicinity of the branching point. Therefore, when the vehicle position is in the vicinity of the branching point, only one headlamp changes its swiveling angle after branching. This headlamp is the one that is in the direction of the single path after branching. Another proposal to decrease the effect of the map-matching error is to continue swiveling the headlamps by the same swiveling angle before branching. Either way, there should be a time period T when the system returns to the single path mode after branching.

To further understand the calculation of the right and left headlamp in blocks 160 and 166, the following example is provided. The example utilizes the following defined parameters: the distance to branch as R; the first branching angle $\beta 1$; the second branching angles $\beta 2$; the vehicle speed as V; the time to reach as TR; the left swiveling angle as $\alpha_L$; the right swiveling angle $\alpha_R$: and the maximum allowable separation angle S.

Given $\beta 1$ and $\beta 2$, then $\beta_R$ is defined as the maximum of $\beta 1$ and $\beta 2$, and $\beta_L$ is the minimum of $\beta 1$ and $\beta 2$. The swiveling angles $\alpha_R$ and $\alpha_L$ can be calculated from the following equations:

$$\alpha_R = \beta_R \left[ \min\left(1, \frac{l + 0.6V - \min(l + 0.6V, R)}{10}\right)\right] \quad (1)$$
$$[(\min(1, (6 - \min(TR, 6))/3))]$$

$$\alpha_L = \beta_L \left[ \min\left(1, \frac{l + 0.6V - \min(l + 0.6V, R)}{10}\right)\right]$$
$$[(\min(1, (6 - \min(TR, 6))/3))]$$

$$TR = \frac{R}{V}$$

Also, $$|\alpha_R - \alpha_L| <= S$$

Where l is the kink point distance. To understand how this equation works, it is analyzed below term by term.

The two minimum terms (min(1) that exist in the right and in the left swiveling equations have a value that is always between 0 and 1. Therefore, multiplication of those two terms will be between 0 and 1. This dictates that the value of $\alpha$ will be always less that or equal to $\beta$. The first term indicates that as long as the value of the distance to branch R is less than the kink point distance l, the right and the left swiveling angles will be zero. The swivel angles should be zero because there is little benefit of swiveling the headlamps if the beam has not reached the branching point yet. This term also indicates that as the vehicle gets closer to the branch, the swiveling angle $\alpha$ increases as the R decreases. The addition of the 0.6*V to the kink point distance l is to compensate for system latency. The second term is a timing term. The timing term dictates that as the time to reach branching decreases, the swiveling angle increases. The swiveling angle increase based on time because of two reasons: the first one is that the need to swivel the headlamps is lower if the speed is very low, and the second is that more confidence is established in the vehicle MLP as time elapses.

Figure 6:
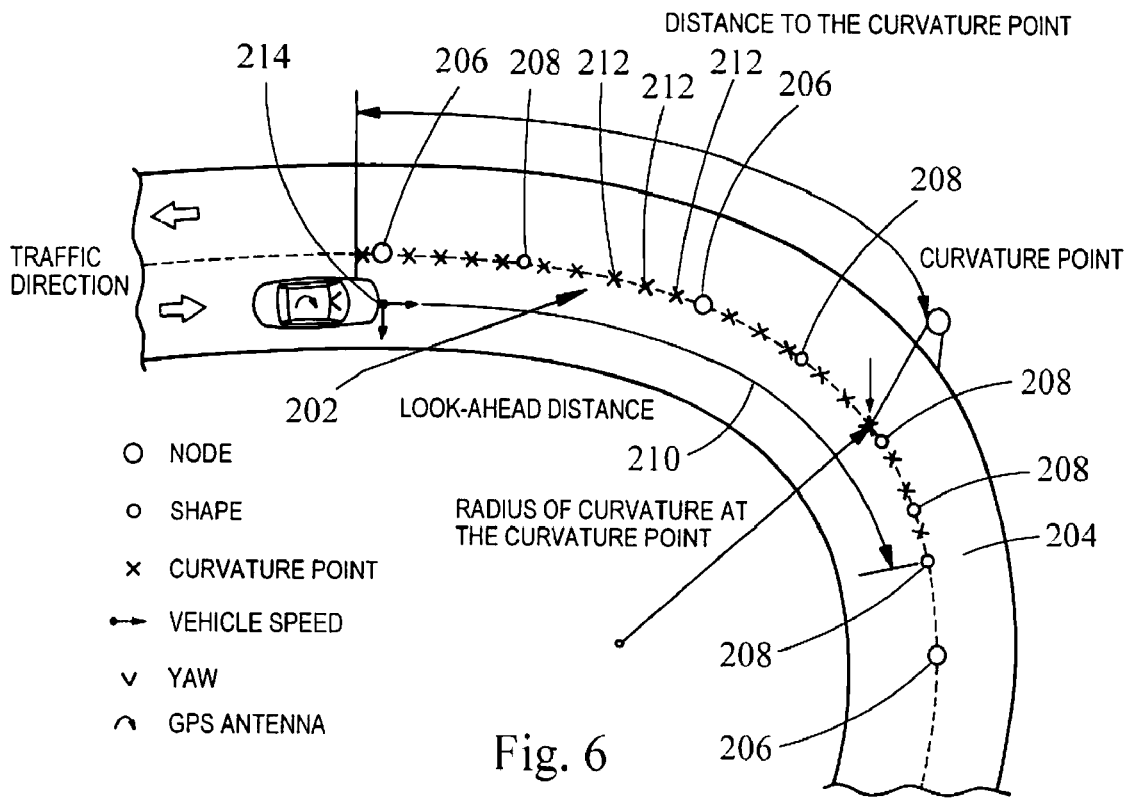
FIG. 6 is a graphical representation of vehicle path map data.

FIG. 6 shows a geometric representation 202 of the predicted path data 204. The geometric representation 202 in the map database 112 is performed using node points 206 and shape points 208. Every road segment in the map starts and ends with a node point 206. Shape points 208 are located between node points 206 to capture the road segment geometry. The path prediction algorithm 118 determines the most likely driving path and calculates the curvature at each of the shape points 208 and node points 206 within the range of the look ahead distance 210. The path prediction algorithm 118 also calculates the curvatures between shape points 208 based on a road model. In illustrative example, twenty curvature points 212 span over the look ahead distance 210 and the associated distances of each curvature point 212 measured from the vehicle position 214 are provided to the PAFS algorithm 122. The PAFS algorithm 122 uses some of these twenty curvature points 212 and distance values to determine the optimal headlamp swiveling angle 124. It will be readily appreciated that a greater or lesser number of curvature points 212 could be used.

As stated above, the path prediction module 118 provides, for example, twenty curvature points 212 along the look ahead distance 210. In addition, the path prediction module 118 also provides other data such as the corresponding geometric distance, travel distance, coordinate position and vehicle heading angle, which for example, is measured from north.

In an optimal design, the headlamp beam 74 itself can be deformed to follow the road geometry. In many implementations, however, the degree of freedom for shaping the beam is not sufficient to achieve such deformation. Some solutions may therefore be sub-optimal. One approach is based on placing the beam's kink point 78, shown in FIG. 2, at a desired lateral distance from the center of the host vehicle lane. However, this approach is subject to the constraint that glare is minimized and visibility is uniformly distributed on the host vehicle lane.

Accordingly, the steps in operating a single path PAFS may include:
1—Calculate the nominal swiveling angle (ϕ) that will place the kink point at a lateral distance D from the host vehicle lane center.
2—Calculate the maximum swiveling angle (ϕ$_L$) that can be used without creating glare to the oncoming traffic or badly affecting the visibility distribution.
3—Calculate the desired swivel angle (ϕ$_f$) as the minimum of ϕ and ϕ$_L$ in the absolute sense or a weighted average of ϕ and ϕ$_L$. The weights given ϕ and ϕ$_L$ may be a function of the difference between the two angles.

The calculation of the swiveling angle ϕ will be based on the curvature and distance data. As shown in FIG. 7, the headlamp beam 74 spans over a non-constant radius of curvature road segment. Even though the path prediction algorithm thoroughly describes the curvature behavior between area 301 and 302, for simplicity of this example, we will assume that the curvature (ρ) is linearly changing between area 301 and area 302. The area 301 is contained between curvature points cp1, cp2 and cp3. Since the separation between the curvature points is a function of speed, this separation of points will help in overcoming the delay. Therefore, $$\rho_v = \frac{\rho_1 + \rho_2 + \rho_3}{3} \quad (1)$$

where
ρ is the curvature at the vehicle position,
ρ$_v$ is the curvature at cp$_1$,
ρ$_2$ is the curvature at cp$_2$; and
ρ$_3$ is the curvature at cp$_3$.

The area 302 is contained between curvature point cp$_l$ (ρ$_l$) at geometric distance of l (distance to the kink point 304) and the next two cp's (ρ$_{next1}$, ρ$_{next2}$). Since the separation between the cp's is a function of speed, this will help in overcoming the delay. Therefore, $$\rho_k = \frac{\rho_l + \rho_{next1} + \rho_{next2}}{3} \quad (2)$$

where
ρ$_k$ is the curvature at the kink point,
ρ$_l$ is the curvature at the distance,
ρ$_{next1}$ is the curvature at the first curvature point beyond cp$_l$ (cp$_{next1}$); and
ρ$_{next2}$ is the curvature at the second curvature point beyond cp$_l$ (cp$_{next2}$).

The curvature change rate (K) between area 301 and area 302 is calculated as $$\kappa = \frac{\rho_k - \rho_v}{l} \quad (3)$$

where l is the geometric distance between cp$_1$ and cp$_l$.

If the kink point 304 is to be placed at a lateral distance D (positive to the left) from the center of the road, the angle ϕ can be approximately related the heading angle (ψ) of the vehicle with respect to the road, the geometric distance l, the curvature ρ$_k$ and ρ$_v$ as follows:

$$\phi = -\psi + \frac{\rho_v}{3}l + \frac{\rho_k}{6}l - \frac{D}{l} \quad (4)$$

where,
ϕ is the nominal swivel angle;
ψ is a heading angle;
ρ$_v$ is the curvature at the vehicle position;
ρ$_k$ is the curvature at the kink point;
l is the distance to the kink point from the vehicle; and
D is a predefined lateral distance from center of the host lane.

In this illustrative example, ψ is positive to the right.

The calculation of the heading angle ψ enables the PAFS algorithm 122 to compensate for driving behavior, for example when performing a lane change. Using a conventional AFS, the swiveling direction of headlamps' beam would follow the steering angle, and, as a result, the upcoming traffic would be glared and the visibility of the road ahead would be reduced.

The calculation of the heading angle can be achieved by using the following equation:

$$\psi = \psi_{gps} - \psi_{cp1\_2} \quad (5)$$

Where ψ$_{gps}$ is the GPS position heading angle measured from the north axis, and ψ$_{cp1\_2}$ is the heading angle measured from the north axis of the vector that passes through cp1 and cp2.

D represents a protection zone against the imperfect accuracy of the curvature values. For example, in the left curve scenario, it is desired to set the lateral distance D such that the kink point 304 will be placed to the outside part of the curve (to the right of the lane center). This will minimize the glaring effect due to any errors in the curvature values.

To improve uniformity in visibility and avoid glare, the maximum swivel angle (ϕ$_L$) is calculated. Introducing the term ρ$_L$ will help to make the visibility almost uniform along the driving path and will decrease the glare to oncoming traffic. However, to guarantee that the visibility uniformity will not be negatively affected and that glare will be controllable, the following approach may be utilized.

The controller 12 determines the curvature point between area 301 and area 302 where the vertical line that equally divides the beam (beam center line 402) has its maximum lateral deviation 404 from the center of the road 405, see FIGS. 7A-D.

As can be noticed from FIGS. 8A-D, the point of maximum deviation 406 is always closer to the maximum of the curvatures at area 301 and area 302, if both curvatures have the same sign. Therefore, the point of maximum deviation 406 can be approximated to be at a distance L where $$L = \frac{l}{2}\left(1 + \frac{|\rho_k| - |\rho_v|}{|\rho_k - \rho_v| + \max(|\rho_v| \cdot |\rho_k|)}\right) \quad (6)$$

The idea behind this formula is that when ρ$_v$ is greater than ρ$_k$ and both have the same sign, the point of maximum deviation will be less than 1/2, which aligns with the concept illustrated in FIGS. 8A-D. On the other hand, if $\rho_k$ is greater than $\rho_v$ and they have the same sign, the point of maximum deviation will be greater than 1/2. If the sign of the two curvatures differ, then the controller 12 sets $\rho_k$=0, i.e.

$$L = \frac{1}{4} \tag{7}$$

Let us assume that a lateral deviation of $D_L$ (for example, (⅛)th the lane width) is acceptable, then the angle threshold can be calculated $$\phi_L = -\psi + \frac{\rho_v}{3}L + \frac{\rho_L}{6}L - \frac{D_L}{L} \tag{8}$$

$\rho_L$ is the curvature at the distance L. The final desired swiveling angle ($\phi_f$) can be the minimum of $\phi$ and $\phi_L$.

$$|\phi_f| = \min(|\phi_L|, |\phi|) \tag{9}$$

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

I claim:

1. A system for adaptive front lighting of a vehicle, the system comprising:
    a first headlamp and a second headlamp configured to cooperatively project a beam pattern;
    a first swivel mechanism coupled to the first headlamp to change a swivel angle of the first headlamp;
    a second swivel mechanism coupled to the second headlamp to change a swivel angle of the second headlamp; and
    a controller configured to determine a most likely path of the vehicle and a secondary path, wherein the controller is configured to calculate a first desired swivel angle of the first headlamp based on the most likely path of the vehicle and a second desired swivel angle of the second headlamp based on the secondary path of the vehicle.

2. The system according to claim 1, wherein the controller is configured to determine the first desired swivel angle based on the branching angle of the most likely path of the vehicle, a distance to branch, and a time to reach the branch.

3. The system according to claim 2, wherein the first desired swivel angle is calculated according to the relationship:

$$\alpha = \beta \left[ \min\left(1, \frac{l + 0.6V - \min(l + 0.6V, R)}{10}\right)\right]$$
$$[(\min(1, (6 - \min(TR, 6))/3))]$$

where $\alpha$ is the first desired swivel angle;
    $\beta$ is the branching angle of the most likely path;
    l is the kink point distance;
    V is the vehicle speed;
    R is the distance to branch; and
    TR is time to branch.

4. The system according to claim 1, wherein the controller is configured to calculate the second desired swivel angle based on the branching angle of the secondary likely path, a distance to branch, and a time to reach the branch.

5. The system according to claim 4, wherein the second desired swivel angle is calculated according to the relationship:

$$\alpha = \beta \left[ \min\left(1, \frac{l + 0.6V - \min(l + 0.6V, R)}{10}\right)\right]$$
$$[(\min(1, (6 - \min(TR, 6))/3))]$$

where $\alpha$ is the second desired swivel angle;
    $\beta$ is the branching angle of the secondary path;
    l is the kink point distance;
    V is the vehicle speed;
    R is the distance to branch: and
    TR is time to branch.

6. The system according to claim 1, wherein the controller is configured to calculate a nominal swivel angle such that a kink point generated by the first headlamp will be a predefined distance from a host vehicle lane center.

7. The system according to claim 6, wherein the nominal swivel angle is calculated according to the relationship:

$$\phi = -\psi + \frac{\rho_v}{2}l + \frac{\rho_k}{6}l - \frac{D}{l}$$

where, $\phi$ is the nominal swivel angle;
    $\psi$ is the heading angle;
    $\rho_v$ is the curvature at the vehicle position;
    $\rho_k$ is the curvature at the kink point;
    l is the distance to the kink point; and
    D is a predefined lateral distance.

8. The system according to claim 6, wherein the controller is configured to calculate a weighted average angle of the first desired swivel angle and the nominal swivel angle.

9. A method for adaptive front lighting of a vehicle, the method comprising:
    determining a most likely path;
    determining a secondary path;
    calculating a first desired swivel angle for a first vehicle headlamp based on the most likely path of the vehicle; and
    calculating a second desired swivel angle for a second vehicle headlamp based on the secondary path.

10. The system according to claim 9, wherein the controller is configured to calculate the first desired swivel angle based on the branching angle of the most likely path, a distance to branch, and a time to reach the branch.

11. The system according to claim 10, wherein the first desired swivel angle is calculated according to the relationship:

$$\alpha = \beta \left[ \min\left(1, \frac{l + 0.6V - \min(l + 0.6V, R)}{10}\right)\right]$$
$$[(\min(1, (6 - \min(TR, 6))/3))]$$

where $\alpha$ is the first desired swivel angle;
    $\beta$ is the branching angle of the most likely path;
    l is the kink point distance;

V is the vehicle speed;
R is the distance to branch; and
TR is time to branch.

12. The system according to claim 10, wherein the controller is configured to calculate the second desired swivel angle based on the branching angle of the most likely path, a distance to branch, and a time to reach the branch.

13. The system according to claim 12, wherein the second desired swivel angle is calculated according to the relationship:

$$\alpha = \beta \left[ \min\left(1, \frac{l + 0.6V - \min(l + 0.6V, R)}{10}\right) \right]$$
$$[(\min(1, (6 - \min(TR, 6))/3))]$$

where $\alpha$ is the second desired swivel angle;
$\beta$ is the branching angle of the secondary path;
l is the kink point distance;
V is the vehicle speed;
R is the distance to branch; and
TR is time to branch.

14. The system according to claim 12, wherein the controller is configured to calculate a nominal swivel angle such that the kink point will be a predefined distance from a host vehicle center lane.

15. The system according to claim 14, wherein the nominal swivel angle is calculated according to the relationship:

$$\phi = -\psi + \frac{\rho_v}{3}l + \frac{\rho_k}{6}l - \frac{D}{l}$$

where, $\phi$ is the nominal swivel angle;
$\psi$ is the heading angle;
$\rho_v$ is the curvature at the vehicle position;
$\rho_L$ is the curvature at the kink point;
l is the distance to the kink point; and
D is a predefined lateral distance.

16. The system according to claim 14, wherein the controller is configured to calculate a weighted average angle of the first desired swivel angle and the nominal swivel angle.

* * * * *

UNITED STATES PATENT AND TRADEMARK OFFICE
CERTIFICATE OF CORRECTION

PATENT NO. : 7,568,822 B2
APPLICATION NO. : 11/692560
DATED : August 4, 2009
INVENTOR(S) : Faroog Abdel-kareem Ibrahim It is certified that error appears in the above-identified patent and that said Letters Patent is hereby corrected as shown below:

In the Claims

In column 10, claim 7, around line 30, replace " $\frac{P_v}{2}l$ " with -- $\frac{P_v}{3}l$ --.

Signed and Sealed this

Third Day of November, 2009

David J. Kappos
*Director of the United States Patent and Trademark Office*